Sept. 27, 1938.  H. N. COMINS  2,131,272
METALLIC PACKING
Filed Aug. 3, 1936
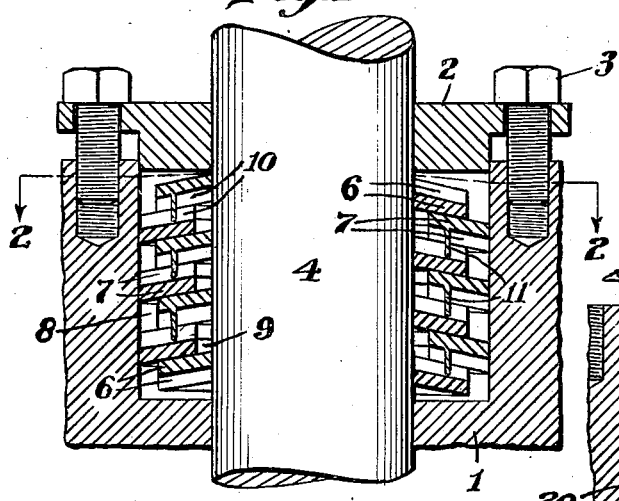
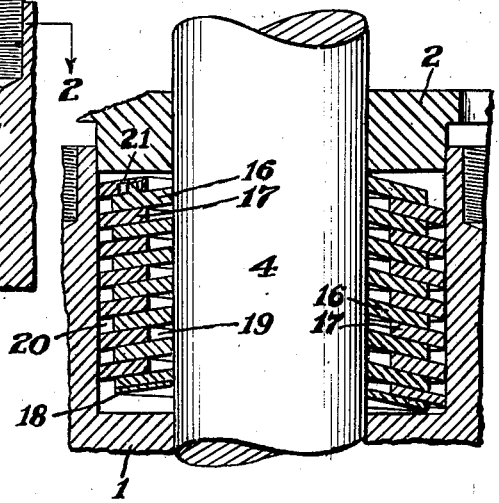
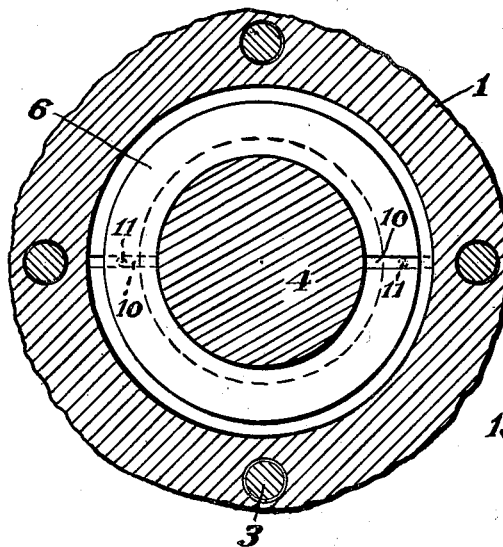
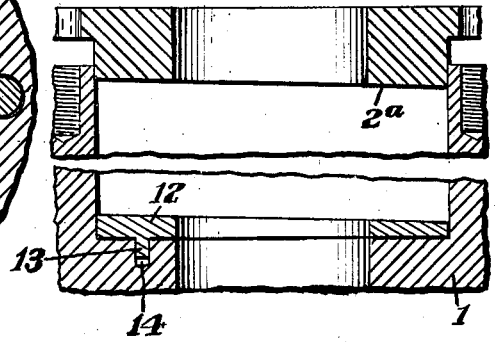
Inventor
Harold N. Comins
Ellis Spear Jr.
By Attorney Patented Sept. 27, 1938

2,131,272

UNITED STATES PATENT OFFICE 2,131,272

METALLIC PACKING

Harold N. Comins, Wakefield, Mass.

Application August 3, 1936, Serial No. 93,960

4 Claims. (Cl. 286—31)

This invention relates to improvements in metallic packings.

Metallic packings have been used for a long time and their characteristics make their use particularly desirable under certain conditions. A typical example of these is the desirability of providing a packing effective to seal a moving element which enters a space, leakage from which or to which is sought to be avoided.

My invention is directed towards the provision of a packing that will be effective for all purposes and particularly in installations where considerable pressures are present.

In accordance with my invention, I utilize thin spring steel discs of conic section. There are two sets of these discs, one set of which has an inside diameter equal to the diameter of the shaft or like object to be packed while the other set is shaped to fit the interior of the packing box. These sets of discs overlap and are slotted to permit their compression to establish a spring pressure contact with the shaft and with the packing box. Discs of each set are alternately used to provide a suitable packing effective to meet the requirements of particular installations.

The sets of discs are coated with a suitable relatively heavy lubricant and the external and internal annular spaces defined by the assembled discs are filled with that lubricant. The disposition of the discs and the blocking of the passages or slots connecting the annular spaces present one of the important features of my invention.

I contemplate a packing in which pressures are resisted by the lubricant confined in the annular spaces by restricted connecting passages so that my packing may be made effective to overcome the pressures present in different installations by increasing the length of the pressure resisting seal by employing a desired number of discs.

In the accompanying drawing I have shown suggested embodiments of my invention from which the above mentioned and other advantages of my invention may be readily appreciated and utilized by those skilled in the art.

In the drawing:

Fig. 1 is a sectional side view of my invention.

Fig. 2 is a view of my invention in cross section along the lines 2—2 of Fig. 1.

Fig. 3 shows in a view similar to Fig. 1 a modified embodiment, and

Fig. 4 is an exaggerated view of a form of washer and gland construction to be used with the embodiment of my invention shown in Fig. 1.

I have shown at 1 a packing box to which the gland 2 is secured by bolts 3. The packing box 1 and the gland 2 are apertured to receive the shaft, rod, or the like, indicated at 4.

My packing consists of a plurality of thin disc members 6 and 7 of spring steel. The discs 6 have an inside diameter equal to the diameter of the shaft 4 and an outside diameter less than than of the packing box 1. The discs 7 are formed to fit the packing box, but have an inside diameter larger than the diameter of the shaft 4.

The discs 6 and the discs 7 are used in pairs and preferably are so disposed that a pair of discs 6 are alternated with a pair of discs 7 in establishing an adequate packing as is suggested in Fig. 1 having external annular spaces 8 and internal annular spaces 9.

The discs 6 and 7 are shaped as conic sections and when assembled are adapted to be compressed as the gland 2 is drawn into contact therewith. Each of the discs 6 and 7 is slotted as at 10 to permit its compression which necessitates the use of the discs in pairs with the slots 10 of each pair separated by 180° preferably to block the annular spaces 8 and 9 and to make more uniform the pressure against the shaft and packing box. Studs or projections 11 are provided on certain of the discs to enter the slots 10 of its complementary disc and the aligned slot 10 of a disc in the next pair of discs. On compression, the spring fit of each disc 6 and 7 to the shaft and the packing box respectively is tightened. The slot 10 of the disc 6 tends to spread at its outer end while the slots 10 of the discs 7 tend to contract near their inner ends. As the studs 11 are utilized to lock the pairs of discs together and to block the flow of lubricant through the slots, the studs 11 are positioned substantially midway between the shaft 4 and the box 1 and clearances are established to permit the above mentioned expansion and contraction of the slots as the discs 6 and 7 are compressed.

The discs which I use are thin and are shown as much enlarged in order to clarify their structural details and any clearances will be very close. The number of pairs of the discs 6 and 7 used varies with the nature of the member packed and its use. For example, more pairs of discs 6 and 7 are employed with increase in pressure factors.

When my packing is installed, the discs are coated and the annular spaces are filled with graphite or other suitable relatively heavy lubricant. Repacking when necessary may be accomplished by dissembling the packing or grease fitting may be utilized to permit the packing to be added without removing the metallic members or discs. It will be apparent that as the gland 2 is tightened, the discs 6 and 7 will be flattened until their fitted diameters are urged into desired spring pressure contact with the shaft 4 and the packing box 1 respectively. This involves a sliding of the discs and a resultant reduction in the size of the annular spaces 8 and 9 so that the lubricant is forced to fill all the voids. The slots 10 effect a continuous passage from one annular space to the other, and are alternately on opposite sides. The slots 10 are blocked by the studs 11 leaving extremely restricted passages so that pressures, in packings composed of sufficient discs, are effectively resisted.

In certain instances, such, for example, as high speed shafts that are continuously operated, it may be desired to negative the possibility of the shaft being "ringed" by the contact of the discs 6. As suggested in Fig. 4, this may be effected by utilizing a washer member 12 and a gland 2ª shaped to cause an operative position of the packing in which the shaft 4 will be continuously wiped by the pairs of discs, preventing uneven wear. The washer member 12 is properly positioned relative to the gland by a stud 13 entering a recess 14 in the bottom of the packing box 2.

The embodiment of my invention shown in Fig. 3 is particularly adapted for use with larger shafts or the like. In this embodiment, a more expensive construction is used in that springs 16 and 17, presenting a sectional similarity to the discs 6 and 7, are used. The spring 16 has an inside diameter the same as the diameter of the shaft 4 and an outside diameter somewhat less than the inside diameter of the packing box 1. The spring 17 has an outside diameter the same as the inside diameter of the packing box and an inside diameter larger than the diameter of the shaft 4.

The spring 17 may be skived if desired while the spring 16 is skived at 18 to permit a continuous contact of the spring 16 against the bottom of the stuffing box 1 when the gland 2 compresses the springs 16 and 17 so that the spaces 19 and 20 which result when the springs 16 and 17 are positioned together will be blocked. The springs 16 and 17 are of slightly different length, the spring 16 being longer to contact the bottom of the packing box so that its skived end makes an annular contact with the bottom of the stuffing box 1 effectively blocking the spaces 19 and 20. The spring 17 is also skived partially blocking the space 20.

At 21 I have shown a slotted interlock of the springs 16 and 17 at their upper ends which permits lateral relative movement of the springs 16 and 17 when compressed.

The springs 16 and 17 are coated and the spaces 19 and 20 are filled with suitable lubricant which blocks any leakage beyond the end of the spring 16.

In accordance with my invention, the metallic members and the lubricant cooperate to establish an effective packing in which the tightness of the fit of the members is insured while outside pressures are resisted.

What I therefore claim and desire to secure by Letters Patent is:—

1. In a packing to be positioned in a packing box around a shaft and to be compressed by a gland, a pair of overlapping members each of hard, thin, sheet spring metal of conic flattenable cross section having a central opening to accommodate the shaft, one of said members having its normal inside diameter corresponding substantially to the external diameter of said shaft and its outside diameter substantially less than the diameter of said packing box, the other of said members having its normal outside diameter corresponding substantially to the internal diameter of said packing box and its inside diameter substantially greater than the diameter of said shaft, said members being positioned in said packing box so that when the gland is tightened said members are flattened to effect an increase in the outside diameter of the first member and a decrease in the inside diameter of said second member, and a decrease in the inside diameter of said first member, and an increase in the diameter of said second member to establish a spring pressure contact with said shaft and said packing box respectively.

2. In a packing adapted to be positioned in a packing box for a shaft or the like, two sets of pairs of discs, each of said discs being of spring steel and of conic section, the discs of one set having their normal inside diameter not less than the diameter of said shaft and their outside diameter substantially less than that of the packing box and the discs of the other set having an inside diameter substantially greater than that of the shaft and an outside diameter not greater than the inside diameter of said box to present on assembly a plurality of internal and external annular grooves for a lubricant, each of said discs being slotted to permit compression thereof, said discs in said pairs being disposed so that the slots thereof are not in alignment and common means for holding said discs in that position in desired relationship to another pair of discs and retarding the flow of lubricant between an external and an internal groove through said slots.

3. In a packing adapted to be positioned in a packing box for a shaft or the like, two sets of pairs of discs, each of said discs being of spring steel and of conic section, the discs of one set having their normal inside diameter not less than the diameter of said shaft and their outside diameter substantially less than that of the packing box, and the discs of the other set having an inside diameter substantially greater than that of the shaft, and an outside diameter not greater than the inside diameter of said box to present on assembly a plurality of internal and external annular grooves for a lubricant to permit under compression an increase in the outside diameter of the discs of said first set, and a decrease in the inside diameter of the discs of said second set without contact with said packing box and said shaft respectively, and a spring pressure contact of said first set of discs with said shaft and a spring pressure contact of said second set of discs with said packing box maintainable during wear by further compression of said discs.

4. In a packing as claimed in claim 1 in which the overlapping members are spiral springs of conic section threaded one within the other.

HAROLD N. COMINS.